(12) United States Patent
Varadarajan et al.

(10) Patent No.: US 9,229,737 B2
(45) Date of Patent: Jan. 5, 2016

(54) METHOD AND SYSTEM OF EMULATING DEVICES ACROSS SELECTED COMMUNICATION PATHWAYS THROUGH A TERMINAL SESSION

(75) Inventors: Srinivasan Varadarajan, Roseville, CA (US); Kevin E. Boyum, Roseville, CA (US); Ivan Farkas, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1314 days.

(21) Appl. No.: 12/694,954

(22) Filed: Jan. 27, 2010

(65) Prior Publication Data

US 2011/0185072 A1  Jul. 28, 2011

(51) Int. Cl.
*G06F 15/16* (2006.01)
*G06F 9/44* (2006.01)
*H04L 29/08* (2006.01)

(52) U.S. Cl.
CPC .......... *G06F 9/4445* (2013.01); *H04L 67/1097* (2013.01)

(58) Field of Classification Search
CPC .......................... G06F 9/4445; H04L 67/1097
USPC .......................................... 709/219, 223, 228
See application file for complete search history.

(56) References Cited

U.S. PATENT DOCUMENTS

| | | | |
|---|---|---|---|
| 5,444,849 A | 8/1995 | Farrand et al. | |
| 6,070,253 A | 5/2000 | Tavallaei et al. | |
| 6,633,905 B1 | 10/2003 | Anderson et al. | |
| 6,904,458 B1 | 6/2005 | Bishop et al. | |
| 6,967,947 B1 | 11/2005 | Chen et al. | |
| 6,973,587 B1 | 12/2005 | Maity et al. | |
| 7,085,385 B2 | 8/2006 | Frantz et al. | |
| 7,174,189 B1 | 2/2007 | Chen et al. | |
| 7,287,107 B2 | 10/2007 | Noonan et al. | |
| 7,761,622 B2 * | 7/2010 | Nguyen | 710/62 |
| 7,827,258 B1 * | 11/2010 | Kalbarga | 709/223 |
| 2002/0138431 A1 | 9/2002 | Antonin et al. | |
| 2003/0084169 A1 | 5/2003 | Zhu et al. | |
| 2003/0084337 A1 | 5/2003 | Simionescu et al. | |
| 2003/0140121 A1 | 7/2003 | Adams | |
| 2003/0226015 A1 | 12/2003 | Neufeld et al. | |
| 2004/0221009 A1 | 11/2004 | Cook et al. | |
| 2005/0097182 A1 | 5/2005 | Bishop et al. | |
| 2005/0125506 A1 | 6/2005 | Luciani, Jr. et al. | |
| 2006/0190238 A1 * | 8/2006 | Autor et al. | 703/25 |
| 2007/0168481 A1 * | 7/2007 | Lambert et al. | 709/223 |

OTHER PUBLICATIONS

Compaq Computer Corporation, "Integrated Lights-Out Technology: Enhancing the Manageability of ProLiant Servers," Apr. 2002, 12 pp.

* cited by examiner

*Primary Examiner* — Yves Dalencourt
(74) *Attorney, Agent, or Firm* — Conley Rose, P.C.

(57) ABSTRACT

Emulating devices across selected communication pathways by way of a terminal session. At least some of the illustrative embodiments are methods including establishing a terminal session between a first computer system and a second computer system (the second computer system distinct from the first computer system, and the second computer system having a management processor with a plurality of communication pathways to a main processor of the second computer system), configuring the management processor to send data regarding emulation of a first mass storage device across a first selected pathway of the plurality of communication pathways to the main processor (the configuring by way of the terminal session), and emulating (by the management processor) the first mass storage device across the first selected pathway.

19 Claims, 2 Drawing Sheets

METHOD AND SYSTEM OF EMULATING DEVICES ACROSS SELECTED COMMUNICATION PATHWAYS THROUGH A TERMINAL SESSION

BACKGROUND

Server computer systems in rack mounted configurations (e.g., blade servers) in many cases do not implement a directly coupled keyboard, mouse or mass storage device (e.g., an optical drive (CD, DVD)). In order to perform administration duties with the respect to a server computer system, the information technologist establishes a remote terminal session. Many remote administration duties work well by way of a remote terminal session; however, other remote administration duties, such as loading large programs or operating systems, suffer based on limited bandwidth between the device of the server computer system that implements the terminal session and the main processor and/or other components of the server computer system.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

"Terminal session" shall mean a communicative connection between a first computer system and a distinct second computer system, where keystrokes from a keyboard directly coupled to the first computer system, and mouse movements from a mouse directly coupled to the first computer system, are forwarded over a communication network to the second computer system, and utilized by the second computer system as if the keyboard and mouse were directly coupled to the second computer system.

"Management processor" shall mean a processor, and possibly related hardware, within a computer system that is distinct from the main processor of the computer system.

"Emulating" or "emulate" shall mean, with respect to a communication pathway, that a device, of different type than the emulated device, appears from the perspective of the communication pathway and/or other upstream devices to be the emulated device.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
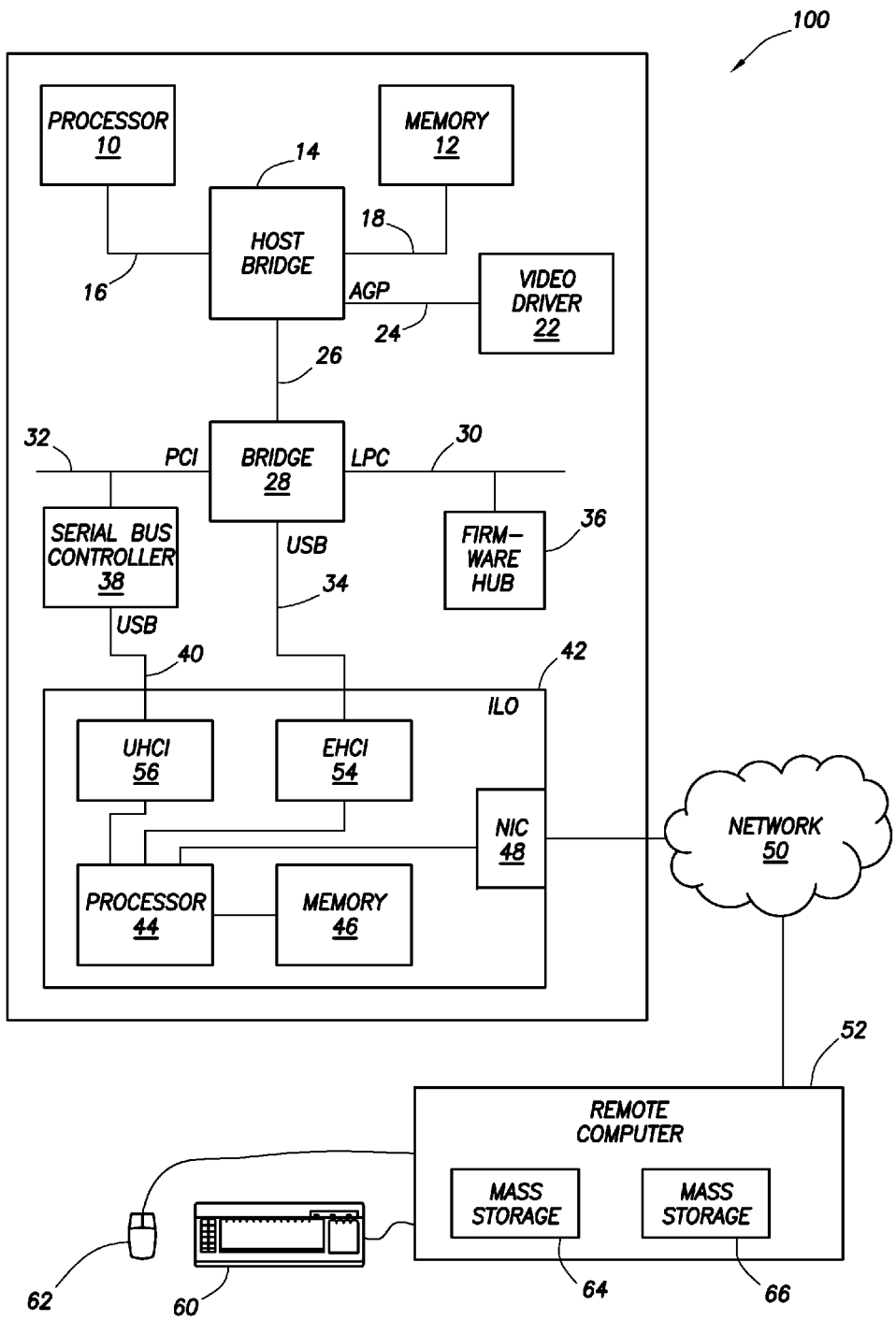
FIG. 1 shows a system in accordance with at least some embodiments.

FIG. 1 illustrates a computer system 100, in some embodiments a server computer system, constructed in accordance with at least some embodiments. In particular, computer system 100 comprises a main processor 10 coupled to a main memory array 12, and various other peripheral computer system components, through integrated host bridge 14. The main processor 10 couples to the host bridge 14 by way of a host bus 16, or the host bridge 14 may be integrated into the main processor 10. Thus, the computer system 100 may implement other bus configurations or bus-bridges in addition to, or in place of, those shown in FIG. 1.

Main memory 12 couples to the host bridge 14 through a memory bus 18. The host bridge 14 comprises a memory control unit 20 that controls transactions to the main memory 12 by asserting control signals for memory accesses. The main memory 12 functions as the working memory for the main processor 10 and comprises a memory device or array of memory devices in which programs, instructions and data are stored. The main memory 12 may comprise any suitable type of memory such as dynamic random access memory (DRAM) or any of the various types of DRAM devices such as synchronous DRAM (SDRAM), extended data output DRAM (EDODRAM), or Rambus DRAM (RDRAM). The main memory 12 is an example of a computer-readable medium storing programs and instructions, and other examples are disk drives and flash memory devices.

In some embodiments the computer system 100 comprises a graphics controller or video driver 22 that couples to the host bridge 14 by way of an Advance Graphics Port (AGP) bus 24, or other suitable type of bus. Alternatively, the video driver 22 may couple to the primary expansion bus 26 or one of the secondary expansion buses (e.g., peripheral components interconnect (PCI) bus 32). The video driver 22 may further couple to a display device which may comprise any suitable electronic display device upon which any image or text can be represented. In some embodiments, the computer system 100 is a server that does not implement a directly coupled display device, and in such embodiments the video driver 22 may be omitted.

Still referring to FIG. 1, the computer system 100 also comprises a second bridge 28 that bridges the primary expansion bus 26 to various secondary expansion buses such as a low pin count (LPC) bus 30, a PCI bus 32, and a serial bus 34 (e.g., Universal Serial Bus (USB)). In accordance with some embodiments, the bridge device 28 comprises an Input/Output Controller Hub (ICH) manufactured by Intel Corporation. Although the bridge device 28 is shown in FIG. 1 to support only the LPC bus 30, PCI bus 32 and USB 34, various other secondary expansion buses may be supported by the bridge device 28. In the embodiments shown in FIG. 1, the primary expansion bus 26 comprises a Hub-link bus, which is a proprietary bus of the Intel Corporation. However, computer system 100 is not limited to any particular type of primary expansion bus, and thus other suitable buses may be equivalently used.

Firmware hub 36 couples to the bridge device 28 by way of the LPC bus 32. The firmware hub 36 comprises read-only memory (ROM) which contains software programs executable by the main processor 10. The software programs comprise not only programs to implement basic input/output system (BIOS) commands, but also instructions executed during and just after power on self test (POST) procedures. The POST procedures as well as the memory reference code perform various functions within the computer system before control of the computer system is turned over to the operating system.

The illustrative computer system 100 further comprises a serial bus controller 38 illustratively coupled to the PCI bus 32. The serial bus controller 38 may couple to any secondary expansion bus, or may alternatively couple to the primary expansion bus 26. The serial bus controller 38 implements an additional serial bus 40 (e.g., USB) for use inside or outside the computer system 100. As will be discussed more thoroughly below, the serial bus 40 operates in conjunction with the serial bus 34 to provide multiple communication pathways to the various system components, such as the main processor 10 and memory 12.

Still referring to FIG. 1, illustrative computer system 100 further comprises management processor 42. The term "management processor" should not be read as limiting the functionality of the device to just that of a standalone processor. In some embodiments, management processor 42 is a standalone processor, while in other embodiments the management processor 42 is an application specification integrated circuit (ASIC) having a processor core, and other components (e.g., memory, and network interface devices). In yet still other embodiments, the management processor 42 is formed from a plurality of individual components grouped together physically, such as on a circuit board coupled within the computer system 100. In some cases, the management processor 42 remains powered and active even when the main processor 10 is powered-off, and thus is often referred to as an integrated lights out (ILO) processor.

In accordance with the various embodiments, the management processor 42 comprises a processor core 44 coupled to memory 46. Thus, programs executed by processor core 44 may be stored in and/or executed from memory 46. Further, the management processor 42 further comprises a network interface controller (NIC) 48. The NIC 48 is configured to couple the management processor 42 to a network 50, such as an Ethernet® network, and to enable the management processor 42 to communicate with external devices, such as remote computer 52. Further in accordance with the various embodiments, the management processor 42 communicatively couples to the main processor 10, and other computer system 100 components, by way of at least two communication pathways. For example, and as illustrated, the management processor 42 couples to both the serial bus 40 associated with the serial bus controller 38, and the serial bus 34 associated with the bridge device 28.

In accordance with at least some embodiments, the serial busses 34 and 40 represent differing capacities. For example, the serial bus 34 associated with bridge device 28 may be a USB 2.0 compliant bus, meaning that the serial bus 34 may have a peak data transfer rate of approximately 480 mega-bits per second (Mbit/s). In order to communicate with the serial bus 34, the management processor 42 may implement an enhanced host controller interface (EHCI) 54, which provides functionality to communicate over the illustrative serial bus 34 operated as a USB 2.0 compliant bus. In some embodiments, the EHCI 54 is dedicated hardware (e.g., as part of the ASIC, or as a standalone controller on circuit board with processor core 44). In other embodiments, the functions of the EHCI 54 are implemented in software executed on the processor core 44.

Continuing the example, the serial bus 40 associated with serial bus controller 38 may be a USB 1.0 compliant bus, meaning that the serial bus 40 may have a peak data transfer rate of approximately 12 Mbit/s. In order to communicate with the serial bus 40, the management processor 42 may implement a universal host controller interface (UHCI) 56, which provides functionality to communicate over the illustrative serial bus 40 operated as a USB 1.0 compliant bus. In some embodiments, the UHCI 56 is dedicated hardware (e.g., as part of the ASIC, or as a standalone controller on circuit board with processor core 44). In other embodiments, the functions of the UHCI 54 are implemented in software executed on the processor core 44. The serial busses 34 and 40 operated as USB 2.0 compliant and USB 1.0 compliant, respectively, are merely illustrative. Any communication pathway, serial or parallel, may be equivalently used (e.g., USB 3.0 compliant pathways, PCI). The functionality of having multiple communication pathways between the management processor 42 and the main processor 10, and/or other system components, may be useful in many situations, particular in remote terminal sessions.

Still referring to FIG. 1, the computer system 100, by way of the NIC 48 of the management processor 42, communicatively couples to remote computer system 52 by way of network 50. Remote computer system 52 comprises a directly coupled keyboard 60 and mouse 62. Moreover, remote computer system 52 also implements one or more mass storage devices, such as mass storage devices 64 and 66. Mass storage devices 64 and 66 may be any currently available or after-developed mass storage devices, such as optical storage devices (e.g., compact disc (CD), digital versatile discs (DVD)), hard disk drives, or flash memory (flash memories having no moving components). In some cases, the network 50 is a separate and dedicated management network, and thus computer system 100 may have other network connections (e.g., a separate connection to the Internet). In other cases, the network 50 to which the remote computer system 52 couples may likewise be the network by which the computer system 100 couples to the Internet, possibly though additional NICs not part of the management processor 42.

In accordance with at least some embodiments, the computer system 100 is a server computer system, possibly a blade server in rack of servers, and thus computer system 100 may not implement a directly coupled keyboard, mouse and/or display device. In order to perform administrative duties on the computer system 100, an administrator may initiate a remote terminal session with computer system 100 by way of remote computer system 52. In a remote terminal session, the keyboard keystrokes and mouse movements supplied at directly coupled keyboard 60 and mouse 62 are sent to the computer system 100 by way of the management processor 42. Likewise, display screens and associated changes thereto, including mouse movements, are forwarded from the management processor 42, possibly in the form of graphics primitives, to the remote computer system 52. Moreover, some remote administration duties utilize one or more mass storage devices 64 and/or 66, such as loading an operating system onto computer system 100, loading user programs onto computer system 100, and/or supplying device drivers to the computer system 100.

In accordance with the various embodiments, the management processor 42 provides data from the remote terminal session with remote computer system 52 over the serial busses 34 and 40. More specifically, the management processor 42 is configured to emulate the various remotely coupled devices selectively on the serial busses 34 and 40. Consider first the keyboard 60 keystrokes and mouse 62 movements. By virtue of the remote terminal session, the remote computer 52 reads the directly coupled keyboard 60 keystrokes and directly coupled mouse 62 movements, and provides the data to the management processor 42. In order to provide the respective keystrokes and mouse movements to the computer system 100, and in accordance with at least some embodiments, the management processor 42 is configured to emulate a keyboard and mouse across a selected one of the serial busses 34 and 40. In the illustrative case of serial busses 34 and 40 being USB compliant busses, the management processor emulates a USB keyboard and USB mouse on a selected one of the serial busses 34 and 40. For example, the keyboard may be emulated across the bus 40, and the mouse may be emulated across the bus 34, or vice versa. As yet another example, both the keyboard and mouse may be emulated across a single bus (e.g., both emulated across bus 34, or both emulated across bus 40). Thus, from the perspective of upstream devices (i.e., serial bus controller 38 or bridge device 34), it appears as though a USB compliant keyboard and USB compliant mouse are coupled thereto.

Further still, the management processor 42 is configured to emulate the various remotely coupled mass storage devices 64 and 66 on the serial busses 34 and 40. By virtue of the remote terminal session, the remote computer 52 reads data from the mass storage devices 64 and 66, and provides the data to the management processor 42. In order to provide the respective mass storage data to the computer system 100, and in accordance with at least some embodiments, the management processor 42 is configured to emulate one or more mass storage devices across a selected one of the serial busses 34 and 40. In the illustrative case of serial busses 34 and 40 being USB compliant busses, the management processor emulates one more USB mass storage devices on a selected one of the serial busses 34 and 40. For example, mass storage device 64 may be emulated across the bus 40, and mass storage device 66 may be emulated across the bus 34, or vice versa. As yet another example, both mass storage devices may be emulated across a single bus (e.g., both emulated across bus 34, or both emulated across bus 40). Thus, from the perspective of upstream devices, like the serial bus controller 38 and bridge device 28, it appears as though one or more USB compliant mass storage devices are coupled thereto. In the illustrative case of mass storage device 64 being an optical drive, the management processor emulates a USB compliant optical drive on a selected one of the serial busses 34 and 40. In the illustrative case of mass storage device 66 being flash drive, the management processor emulates a USB compliant flash drive on a selected one of the serial busses 34 and 40. It is noted, however, that the mass storage devices 64 and 66 need not themselves be USB compliant devices; rather, regardless of the actual mass storage type the management processor 42 emulates the devices to be compliant with the particular bus type implemented by the controller 38 and/or bridge device 28.

As alluded to above, the management processor 42 in accordance with the various embodiments may selectively perform the emulation on any desired bus. Consider, as an example, that a remote administrator, by way of a remote terminal session through remote computer 52, desires to load an operating system on the computer system 100. As part of loading the operating system, programs will be provided from mass storage device 64 illustratively being an optical drive, device drivers will be provided from mass storage device 66 illustratively being a flash drive, as well as various keyboard and mouse commands. In accordance with the various embodiments, by way of the remote terminal session the various data streams may be selectively assigned to the various serial busses. For example, the administrator, by way of the remote terminal session, may select serial bus 34 (illustratively operated as a USB 2.0 compliant bus) as the bus across which the optical device is emulated. Further, the administrator, again by way of the remote terminal session, may select serial bus 40 (illustratively operated as a USB 1.0 compliant bus) as the bus across which the flash drive is emulated. Finally, the administrator may select serial bus 40 as the bus across which the keyboard and mouse are emulated. In this example, the bulk of the data to be provided (in the form of programs from the optical device) are provided across the higher peak bandwidth communication bus, while the remaining data, programs, keyboard entries and mouse movements traverse the other communication bus. In this way, the overall time used to transfer the programs and/or data may be less than if all the data and programs are moved across a single communication bus. In other cases, both mass storage devices may be emulated on a single communication bus (e.g., serial bus 34), and the mouse and keyboard emulated on the other communication bus 40. The bus selection and emulation discussed above is merely illustrative. In accordance with the various embodiments, the management processor may selectively emulate each device across any serial bus 34 and/or 40, in any combination, that provides an advantage in the particular situation.

Figure 2:
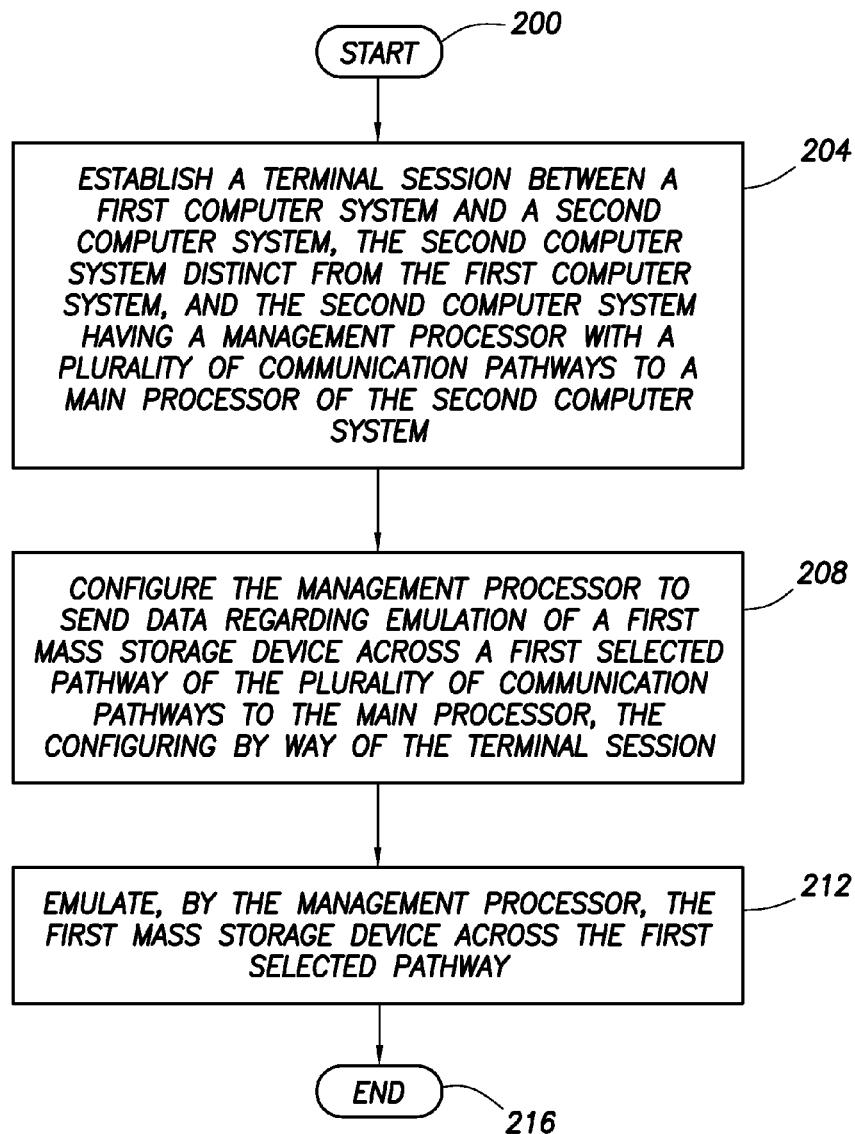
FIG. 2 shows a method in accordance with at least some embodiments.

FIG. 2 illustrates a method, which may be implemented as software, in accordance with at least some embodiments. In particular, the method starts (block 200) and proceeds to establishing a terminal session between a first computer system and a second computer system (block 204), the second computer system distinct from the first computer system, and the second computer system having a management processor with a plurality of communication pathways to a main processor of the second computer system. The illustrative method then proceeds to configuring the management processor to send data regarding emulation of a first mass storage device across a first selected pathway of the plurality of communication pathways to the main processor (block 208), the configuring by way of the terminal session. Next, the method comprises emulating, by the management processor, the first mass storage device across the first selected pathway (block 212), and the illustrative method ends (block 216).

From the description provided herein, those skilled in the art are readily able to combine software created as described with appropriate general-purpose or special-purpose computer hardware to create a computer system and/or computer subcomponents in accordance with the various embodiments, to create a computer system and/or computer subcomponents for carrying out the methods of the various embodiments, and/or to create a non-transitory computer-readable storage media for storing a software program to implement the method aspects of the various embodiments. Non-transitory in this case is used to distinguish carrier waves carrying data (e.g., electromagnetic propagation, electrical current on a conductor) from media storing data. "Non-transitory" shall not be construed to refer to the usable life span of a particular computer-readable media, or the length of time data may reside on a computer-readable medium.

The above discussion is meant to be illustrative of the principles and various embodiments of the present invention. Numerous variations and modifications will become apparent to those skilled in the art once the above disclosure is fully appreciated. For example, while only two serial busses are used to communicate between management processor and the remaining computer system components, two or more busses of any suitable type may be used. It is intended that the following claims be interpreted to embrace all such variations and modifications.

What is claimed is:

1. A method comprising:
 establishing a terminal session between a first computer system and a second computer system, the second computer system distinct from the first computer system, and the second computer system having a management processor with a plurality of communication pathways to a main processor of the second computer system;
 configuring the management processor to send data regarding emulation of a first mass storage device of the first computer system across a first selected pathway of the plurality of communication pathways to the main processor, the configuring by way of the terminal session; and then
 emulating, by the management processor, the first mass storage device across the first selected pathway.

2. The method of claim 1 wherein configuring further comprises:
 configuring the management processor to send data regarding emulation of a second mass storage device, distinct from the first mass storage device, across a second selected pathway of the plurality of communication pathways; and
 emulating, by the management processor, the second mass storage device across the second selected pathway.

3. The method of claim 2 wherein emulating further comprises emulating both the first mass storage device and the second mass storage device across the same pathway of the plurality of communication pathways.

4. The method of claim 1 wherein establishing further comprises establishing the terminal session with the second computer system having a plurality of Universal Serial Bus (USB) communication pathways as the plurality of communication pathways between the management processor and the main processor.

5. The method of claim 4 wherein establishing further comprises establishing the terminal session with the second computer system having a first USB communication pathway having a first peak data throughput and a second USB communication pathway having a second peak data throughput greater than the first peak data throughput.

6. The method of claim 1 wherein emulating further comprises emulating at least one selected from the group consisting of: an optical storage device; a disk drive; and a flash drive.

7. The method of claim 1 wherein the management processor is configured to emulate a keyboard and mouse device across a selected one of the plurality of serial communication pathways.

8. A computer system comprising:
 a main processor;
 a memory coupled to the main processor;
 a bridge device coupled to main processor;
 a management processor communicatively coupled to the bridge device by way of a first serial communication pathway, and the management processor coupled to the bridge device by way of a second serial communication pathway distinct from the first serial communication pathway;
 the management processor configured to establish across a network a terminal session between the computer system and a remote device; and
 the management processor configured to emulate a first mass storage device of the remote device across either of the serial communication pathways, the serial communication pathway utilized for emulation selected by way of the terminal session.

9. The computer system of claim 8 wherein the first serial communication pathway is a universal serial bus (USB) compliant communication pathway, and the second serial bus is a USB compliant communication pathway.

10. The computer system of claim 8 further comprising:
 a communication controller coupled to the bridge device, the communication controller implements the first serial communication pathway;
 the bridge device implements the second serial communication pathway; and
 the management processor couples directly to communication controller for the first serial communication pathway, and the management processor couples directly to the bridge device for the second communication pathway.

11. The computer system of claim 8 wherein the management processor is configured to emulate the first mass storage device based on data from a first mass storage device of the remote device.

12. The computer system of claim 8 wherein the management processor is further configured to emulate a second mass storage device across either of the serial communication pathways, the serial communication pathway utilized for emulation of the second mass storage device selected by way of the terminal session.

13. The computer system of claim 12 wherein the management processor is configured to emulate the second mass storage device based on data from a second mass storage device of the remote device.

14. The computer system of claim 8 wherein the first serial communication pathway has a first peak data transfer rate, and the second serial communication pathway has a second peak data transfer rate greater than the first peak data transfer rate.

15. The computer system of claim 8 wherein the first serial communication pathway has a peak data transfer rate of 12 mega-bits (Mbit) per second (Mbit/s), and the second communication pathway has a peak data transfer rate of 480 Mbit/s.

16. A computer-readable storage medium storing a program that, when executed by a management processor, causes the management processor to:
 establish a terminal session with a remote computer system, the remote computer system having a first mass storage and second mass storage device;
 select, by way of the remote computer system, a first selected serial communication pathway across which to emulate the first mass storage device;
 select, by way of the remote computer system, a second selected serial communication pathway across which to emulate the second mass storage device;
 emulate the first mass storage device across the first selected serial communication pathway; and
 emulate the second mass storage device across the second selected serial communication pathway.

17. The computer-readable storage medium of claim 16 wherein when the management processor selects the first and second selected serial communication pathways, the program causes the management processor to select different serial communication pathways.

18. The computer-readable storage medium of claim 16 wherein when the management processor emulates the first mass storage device, the program further causes the management processor to emulate the first mass storage device as a Universal Serial Bus (USB) compliant device.

19. The computer-readable storage medium of claim 16 wherein the program further causes the management processor to:
   select, by way of the remote computer system, a third selected serial communication pathway across which to emulate a mouse and keyboard; and
   emulate the mouse and keyboard across the third selected serial communication pathway based on the mouse and keyboard data supplied by the remote computer system.

* * * * *